United States Patent [19]

Christophe et al.

[11] Patent Number: 4,592,838
[45] Date of Patent: Jun. 3, 1986

[54] FILTER INCORPORATING TWO DISTINCT FILTERING STACKS

[75] Inventors: Théophile Christophe, Fontenay Le Fleury; Jean-Claude Moatti, Boulogne, both of France

[73] Assignee: Georges Moatti, France

[21] Appl. No.: 668,704

[22] Filed: Nov. 6, 1984

[30] Foreign Application Priority Data

Nov. 16, 1983 [FR] France ................ 83 18229

[51] Int. Cl.$^4$ ................ B01D 25/02; B01D 25/32
[52] U.S. Cl. ................ 210/323.1; 210/333.01; 210/345; 210/347; 210/444
[58] Field of Search ............. 210/323.1, 333.01, 333.1, 210/345–347, 411, 413, 414, 440, 443, 444, 472

[56] References Cited

U.S. PATENT DOCUMENTS

| | | | |
|---|---|---|---|
| 2,743,018 | 4/1956 | Belgarde | 210/440 X |
| 2,748,949 | 6/1956 | James | 210/440 X |
| 2,868,383 | 1/1959 | Nicolls | 210/323.1 |
| 3,561,602 | 2/1971 | Molitor | 210/335 X |
| 3,944,488 | 3/1976 | Moatti | 210/345 X |
| 3,975,273 | 8/1976 | Shaltz et al. | 210/440 X |
| 3,994,810 | 11/1976 | Schaeffer | 210/333.1 X |
| 4,481,111 | 11/1984 | Christophe et al. | 210/333.01 |
| 4,517,082 | 5/1985 | Prudhomme | 210/440 X |

FOREIGN PATENT DOCUMENTS 1018845 11/1957 Fed. Rep. of Germany ... 210/323.1
799990 8/1958 United Kingdom ............ 210/323.1

Primary Examiner—Robert Spitzer
Attorney, Agent, or Firm—Poms, Smith, Lande & Rose

[57] ABSTRACT

The invention relates to a filter comprising main and secondary filtering stacks and a distribution valve provided with main and secondary enclosures adapted to isolate the filtering elements of the two stacks section by section with a view to deblinding them. According to the invention, a port, with which the distribution valve is provided, connects the main and secondary enclosures. One application of the invention is the production of a filter with high yield of filtration.

2 Claims, 7 Drawing Figures

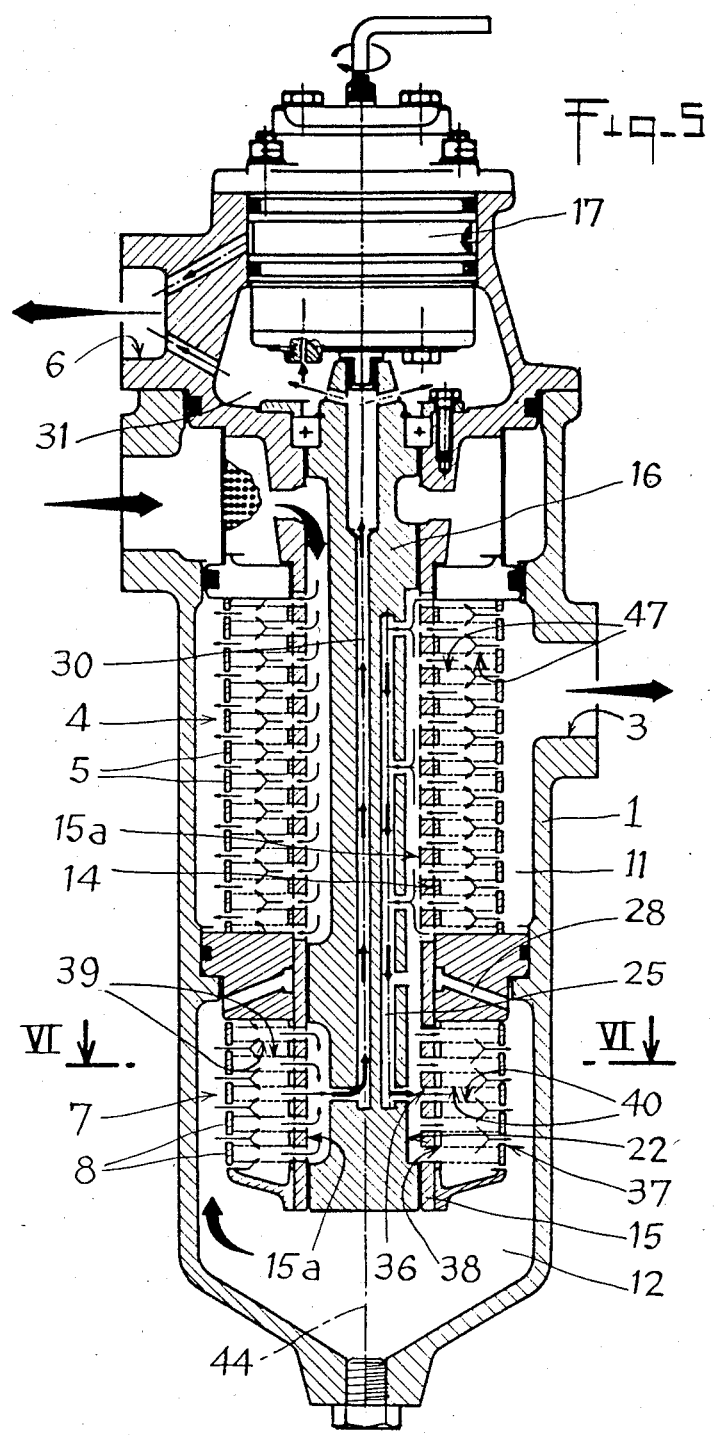

FILTER INCORPORATING TWO DISTINCT FILTERING STACKS

The present invention relates to a filter incorporating two distinct filtering stacks.

Filters are already known, having a main filtration zone with periodical deblinding of the filtering elements, and a secondary filtration zone, likewise with periodical deblinding of its filtering elements.

Such a filter is, for example, constituted by:
- a filter body comprising a plurality of distinct chambers isolated from one another,
- a main stack of filtering elements contained in one of said chambers, called main chamber,
- a secondary stack of filtering elements contained in another of said chambers, called secondary chamber, each of the filtering elements of the main and secondary stacks having a recessed centre and a cylindrical side, comprising a plurality of sections isolated from one another and being provided on its outer and inner radial circumferences with orifices for communication of each of its sections with said circumferences,
- a shut-off distribution valve which is adjusted to said cylindrical side, which is mounted to rotate about the axis of the cylindrical side, and which comprises one main enclosure capable, in a first position of the distribution valve, of isolating a first section of any one filtering element of the main stack from the other sections of said filtering element and of communicating with said first section via the orifice for communication of said first section, and one secondary enclosure capable, in a second position of the distribution valve possibly merged with the first position, of isolating a first section of any one filtering element of the secondary stack from the other sections of said filtering element and of communicating with said first section via the orifice for communication of said first section.

According to the prior art, the fluid used for deblinding the filtering elements of the main stack is taken from the fluid already filtered by this stack. Similarly, the fluid used for deblinding the filtering elements of the secondary stack is also taken from the fluid filtered by the main stack. This second tapping accordingly reduces the flow rate of the fluid filtered by the main stack effectively usable; this may be considered as constituting a drawback. To overcome this drawback, the invention proposes a novel arrangement according to which deblinding of the filtering elements of the secondary stack is effected by the fluid having already deblinded the filtering elements of the main stack. The second tapping from the fluid already filtered by the main stack may in this way be avoided.

To this end, the invention therefore consists, in a filter as described hereinabove, in that a port with which the distribution valve is provided, connects the main and secondary enclosures.

According to a preferred embodiment, a connecting duct connects the secondary chamber to the cylindrical side and opens out in this cylindrical side by a discharge orifice located at a spot such that, on the one hand, in the second position of the distribution valve, the latter obturates said discharge orifice, on the other hand, the distribution valve comprising another inside port connecting its two main and secondary enclosures to its outer circumference, in the positions of the distribution valve other than said second position, the discharge orifice communicates with said other port.

The advantage of this novel arrangement lies in economizing, in the rate of flow filtered by the main stack, the value of the rate of flow necessary for deblinding the filtering elements of the secondary stack. In this way, with a filter having given dimensions, an increase in the overall output is observed.

The invention will be more readily understood on reading the following description with reference to the accompanying drawings, in which:

FIG. 5 is an axial section through the same filter as that of FIG. 1, but in a second configuration of operation;

Figure 1:
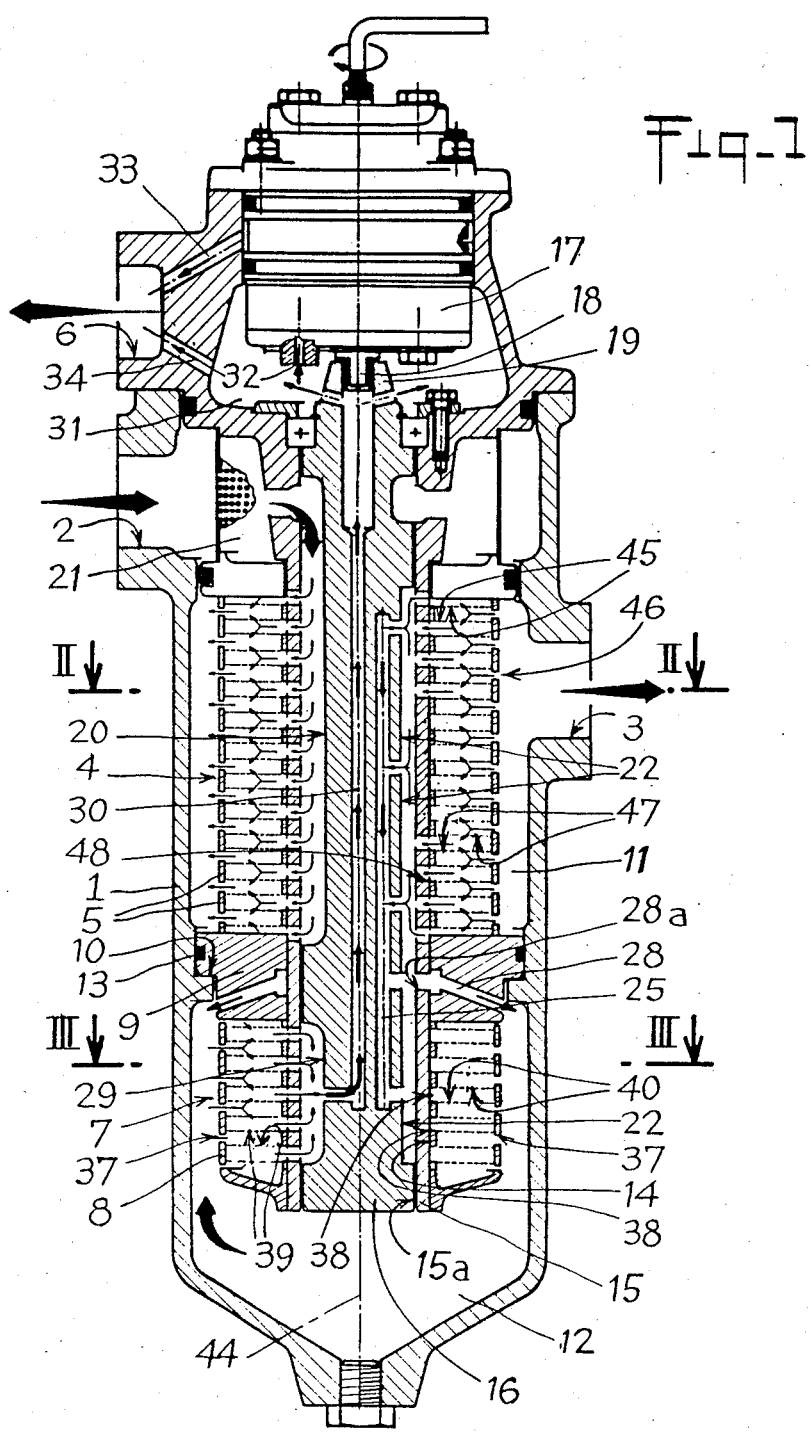
FIG. 1 is an axial section through a filter according to the invention, in a first configuration of operation.

Referring now to the drawings, the filter of FIGS. 1 to 4 comprises:
- a filter body 1, provided with an admission union 2 for the fluid having to be filtered, an evacuation union 3 for the fluid filtered by a main stack 4 of filtering elements 5, and with an evacuation union 6 for the deblinding fluid of the filtering elements 5, after filtration of this deblinding fluid by a secondary stack 7 of filtering elements 8,
- said main and secondary stacks 4 and 7 respectively, separated by an intermediate piece 9, which bears on a shoulder 10, with which the body 1 is provided, and which forms inside said body two main and secondary chambers 11 and 12 respectively, separated with seal (13), the main chamber 11 communicating with the evacuation union 3,
- a bore 14, common to the two stacks 4 and 7, to which is fitted an inside ring 15, inside which a distribution valve 16 is mounted in a bore 15a, rotatable about an axis 44,
- a hydraulic motor 17, for step-by-step drive of the distribution valve 16, mounted on the body 1 and coupled by a drive head 18 to one end 19 of the distribution valve 16,
- a peripheral groove 20, made in the distribution valve 16, which is in communication with the admission chamber 21 for the fluid having to be filtered, itself being in communication with the admission union 2,
- a groove 22, which is formed in the distribution valve 16 and makes it possible to isolate one angular section 23 of certain only, or of all the filtering elements 5 of the main stack 4 from the other angular sections 24 of the same filtering elements 5,
- the groove 22 formed in the distribution valve 16 is capable of communicating, on the one hand (FIGS. 1 and 3), via a duct 25 inside the distribution valve, with the orifice 28a by which one of the ducts 28, made in the intermediate piece 9, opens into the bore 15a of the ring 15, on the other hand (FIGS. 5 and 6), with only one angular section 27 of each filtering element 8 of the secondary stack 7,
- a peripheral groove 29, made in the distribution valve 16, which communicates, by a duct 30 inside the valve 16, with an upper chamber 31 made in the body 1, supply ducts 32 for the motor 17, communicating with the upper chamber 31, the exhaust duct 33 of the motor 17 communicating with the evacuation union 6, a calibrated connecting duct 34 (having a given pressure drop) connecting the upper chamber 31 to the evacuation union 6.

The following arrangements should be noted:

the groove 22 is capable of communicating, via holes 35a, 35b, 35c made in the ring 15 in the zone of the main stack 4, with a section 23 of the corresponding filtering elements 5;

this same groove 22 is capable of communicating, via holes 36 made in the ring 15 in the zone of the secondary stack 7, with a section 27 of the corresponding filtering elements 8;

the duct 28, made in the intermediate piece 9, opens out, in addition, into the secondary chamber 12;

orifices 37 in the filtering elements 8 of the secondary stack 7 are disposed on the outer circumference of this stack and are separated from orifices 38 of the same filtering elements disposed on the inner circumference and communicating with the holes 36 of the ring 15, by the filtering screens;

these filtering screens each have a side 39 which communicates with the secondary chamber 12 via the orifices 37, and a side 40 which communicates with the central bore 14 via the orifices 38;

the holes in the ring 15 disposed in the zone of the main stack 4 are divided, for each column of superposed sections 23 or 24 of the filtering elements 5, into three distinct groups of orifices 35a, 35b, 35c;

the orifices of each group being aligned on a straight line 41a, 41b, 41c, respectively, parallel to a generatrix of the cylindrical surface of the bore 15a of the ring 15; these various straight lines 41a, 41b, 41c, further being slightly offset with respect to one another so that the groove 22 communicates permanently only with an overall section of the holes 35a and/or 35b and/or 35c which is substantially constant and equal to the overall section of the holes 35a, or of holes 35b, or of holes 35c, and not of all the holes 35a, 35b and 35c;

the groove 22 is itself parallel to a generatrix of the cylindrical surface of the bore 15a of the ring 15;

the holes 36 in the ring 15, which correspond to the orifices 38 of the superposed sections of the same column of sections of filtering elements 8, are aligned on a straight line 42, parallel to a generatrix of the cylindrical surface of the bore 15a of the ring 15;

depending on the relative position of the distribution valve 16 with respect to the ring 15, in the example shown, either the groove 22 is isolated from holes 36 (FIGS. 1, 3 and 4) and in that case communicates with one of the orifices 28a, or the groove 22 communicates with the holes 36 of one of the rows of holes 36 (FIGS. 5, 6 and 7) and is in that case isolated from orifices 28a;

the filtering screens of the filtering elements 5 of the main stack 4 each have a side 45 which communicates with the main chamber 11 via orifices 46, and a side 47 which communicates with the holes 35a, 35b or 35c in the ring 15 via orifices 48;

the axis of duct 30 merges with the axis of rotation 44.

The fluid having to be filtered, admitted into the admission chamber 21, arrives in the groove 20 of the distribution valve, passes through the orifices of the inner circumference of the sections 24 of the filtering elements 5 which are opposite the groove 20, then through the corresponding holes 35a and/or 35b and/or 35c in the ring 15, passes through the screens, then the orifices in the outer circumference of the same sections, and emerges filtered in the main chamber 11 in order thereafter to be evacuated through the evacuation union 3.

Figure 2:
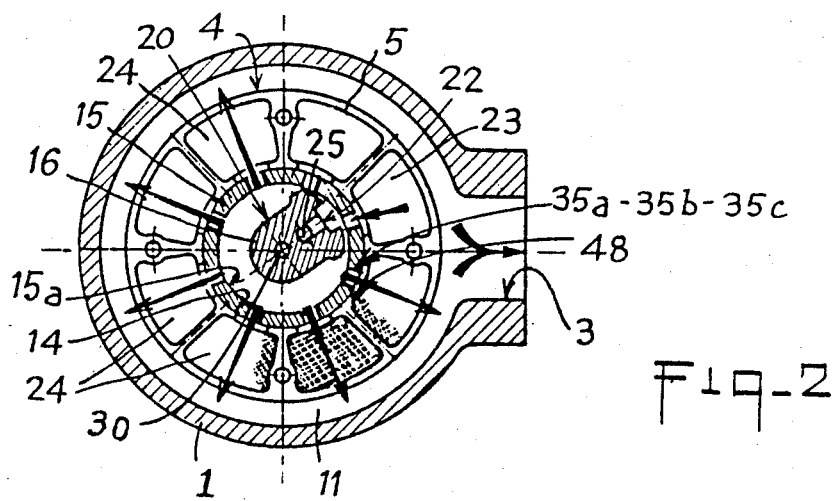
FIGS. 2 and 3 are sections, along II II and III—III respectively, of FIG. 1.

However, part of the filtered fluid contained in the main chamber 11 passes, in the direction opposite the preceding one, from the outer circumference towards the inner circumference of the stack 4, through those sections 23 of the filtering elements 5 which are disposed opposite the groove 22 (FIG. 2). This small part of the filtered fluid makes it possible to clear the screens of said sections 23 of the impurities which were previously deposited thereon and, by cleaning these screens, thus render them capable again of efficient filtration. This part of the fluid, which passes through the screens of sections 23 is collected by the groove 22 and conveyed, laden with the impurities detached from the screens of sections 23 of the filtering elements 5 opposite the part of the ring 15 corresponding to the orifices 28a and to holes 36.

Figure 3:
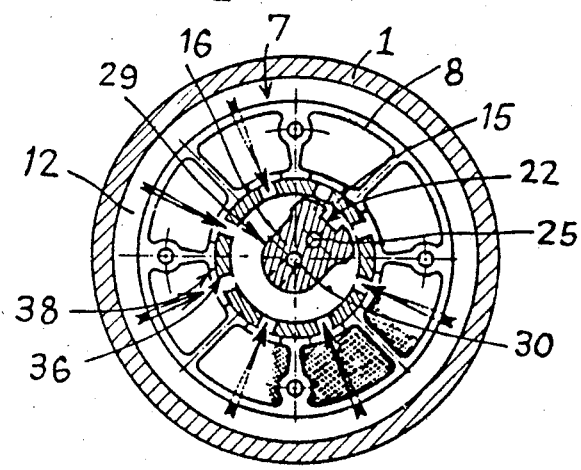
Figure 4:
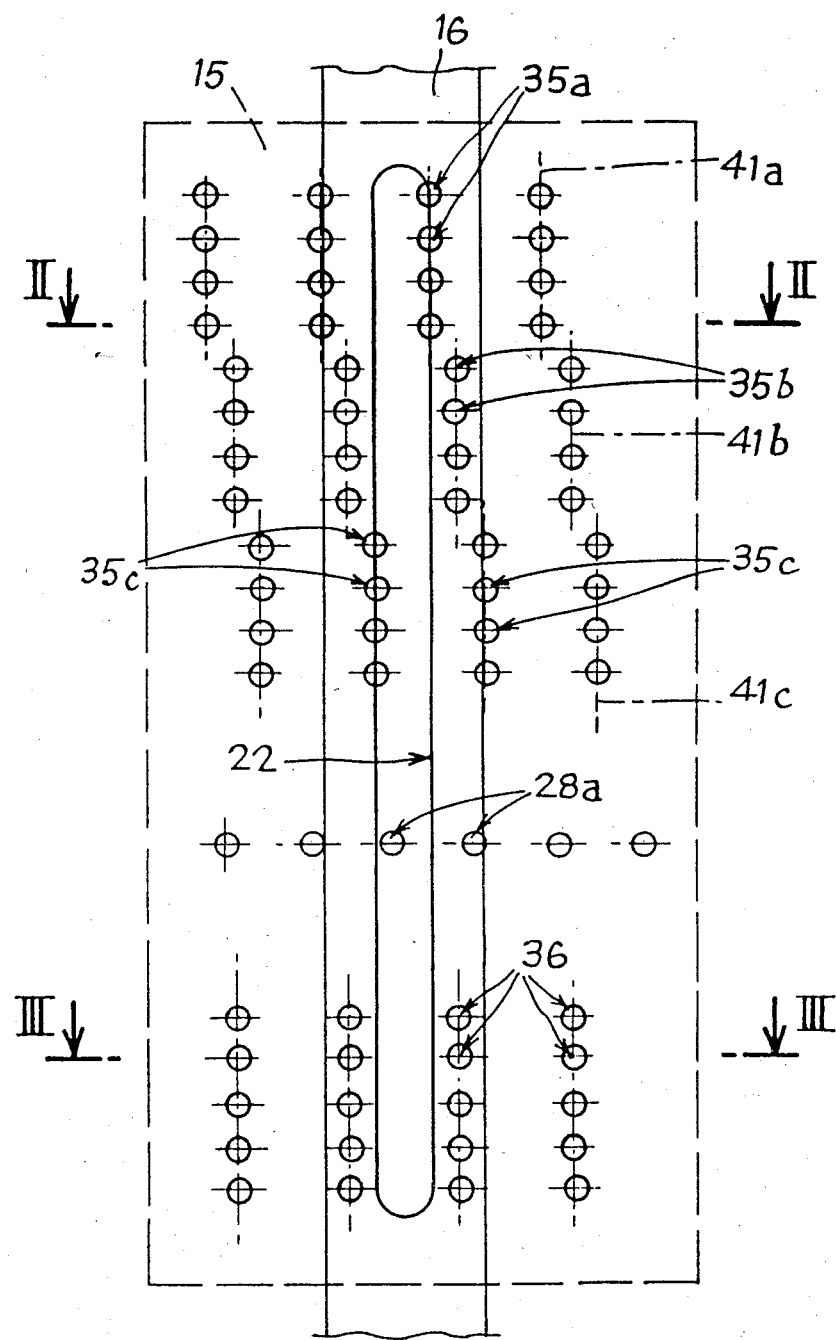
FIG. 4 is a developed view of the cylindrical side of the distribution valve of the filter of FIG. 1 and of the side opposite the stacks of filtering elements.

In the configuration of FIGS. 1, 3 and 4, this fluid laden with impurities is poured into the secondary chamber 12. From this chamber, the fluid crosses, from the outer circumference towards the inner circumference of the sections of the filtering elements of the secondary stack 7, which are opposite the groove 29 of the distribution valve 16, and, filtered by the screens of said sections, from the groove 29 is directed by duct 30, chamber 31 and duct 34 towards the evacuation union 6 for further use. It should be noted that, in likewise known manner, part of this filtered fluid contained in the upper chamber 31 is used as supply fluid for motor 17 (ducts 32).

Figure 6:
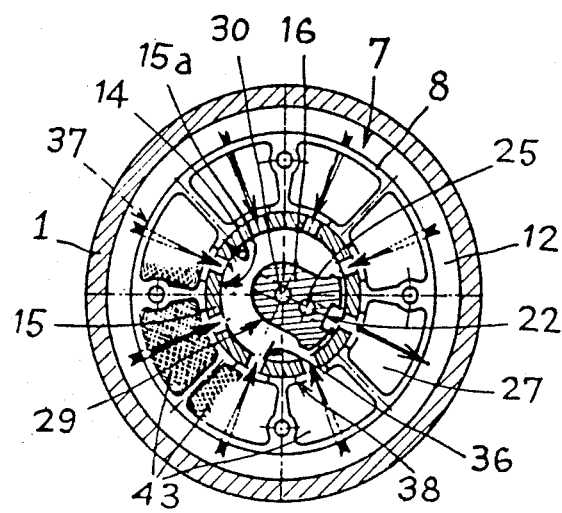
FIG. 6 is a section along VI—VI of FIG. 5.
Figure 7:
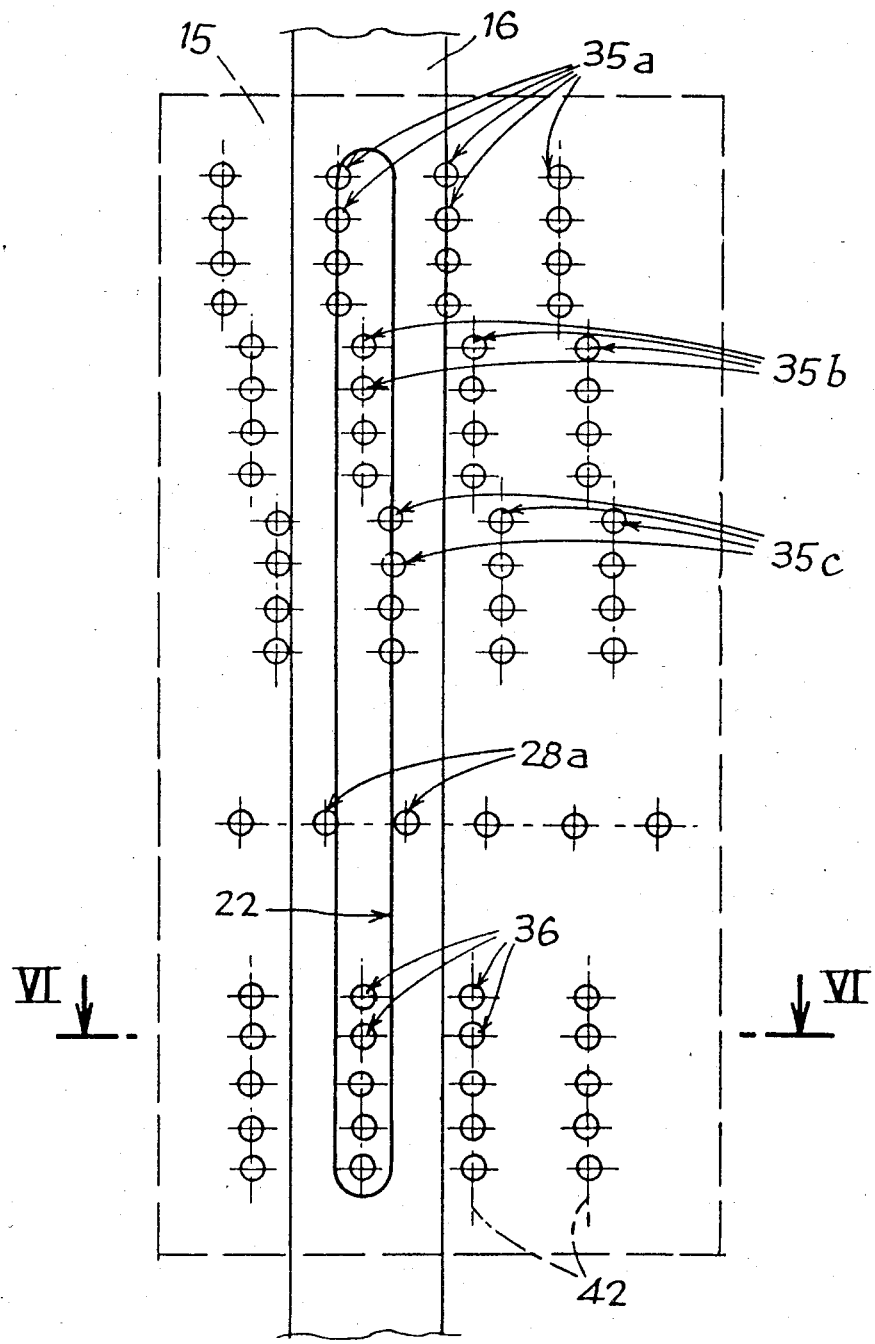
FIG. 7 is a developed view similar to that of FIG. 4, but corresponding to the configuration of FIG. 5.

In the configuration of FIGS. 5, 6 and 7, the fluid laden with impurities, contained in the groove 22, passes through holes 36 and orifices 38, deposits its impurities on the sides 40 of the screens of sections 27 of the filtering elements 8 and, passing through the orifices 37, arrives in chamber 12. By the circuit already defined hereinbefore, the fluid of chamber 12 is filtered, then conveyed up to the evacuation union 6.

The following remarks may be made:

during operation, the fluid contained in the chamber 12 escapes therefrom by passing through the orifices 37, then depositing the impurities that it contains on the sides 39 of the sections 43 other than the section 27 of each filtering element 8;

naturally, if impurities have previously been deposited on sides 40 of the screens of the filtering elements 8, this occurring in the configuration of FIGS. 5, 6 and 7, the fluid which passes through said screens to escape from the secondary chamber 12 detaches these impurities and conveys them into the groove 29, then into ducts 30, up to the evacuation union 6, which did not occur in the prior known filters in which the washing/deblinding fluid of the screens of sections 27 (FIGS. 5, 6 and 7) was filtered fluid coming from the main chamber 11;

on the other hand, what is also novel and very advantageous is to effect washing/deblinding of the screens of the sections 27 of the filtering elements 8, by driving away the impurities deposited on their faces 39 by means of the same fluid as that which already effected washing/deblinding of the sections 23 of the filtering elements 5 and which is contained in the groove 22, since thus is made the saving of the tapping in the fluid already filtered, contained in the main chamber 11, which was previously necessary, as indicated in the preceding paragraph;

finally, the washing/deblinding operation of the sections 27 of the filtering elements 8 can be effected, as is the case in the embodiment shown, only when the fluid contained in the groove 22 does not flow directly into the secondary chamber 12 (orifices 28a obturated by the distribution valve 16—FIG. 7).

In summary, the novelty according to the invention consists in having made a connection in series of the groove of the distribution valve allowing washing/deblinding of the filtering elements 5 of the main stack 4 with the groove allowing washing/deblinding of the filtering elements 8 of the secondary stack 7. In the embodiment shown, this is a single groove 22.

The resulting advantage is a saving of the fluid already filtered by the main stack 4, and consequently a very appreciable increase in the yield of filtration. To effect the operation of washing/deblinding of the screens of the filtering elements 8 of the secondary stack 7, it is in fact possible to use a fluid already partially polluted, in place of a strictly filtered fluid, since, in any case, the impurities are stopped by the sides 40 of the screen. An analogy is to be found in the use of nondrinking water to wash an object not requiring the use of drinking water, in place of drinking water.

The drawback mentioned hereinbefore is that of having a fluid arriving in the upper chamber 31 which is less pure than with the prior known filters. This is only an apparent drawback, as the quality of this fluid is often sufficient for the use of said fluid. In this latter case, the increase in the number of impurities contained in the fluid of the upper chamber 31 is then without consequence and no longer constitutes a drawback.

In the event of the fluid contained in chamber 31 containing too many impurities to allow satisfactory supply of the motor 17, it would still be possible to effect supply of this motor by a suitably cleansed fluid, for example by taking part of the filtered fluid passing through the evacuation union 3, moreover in manner known per se.

Another advantage lies in the possibility of effecting washing/deblinding of the main stack in continuous manner due to the simultaneous nature of the washing/deblinding of the secondary stack.

The invention is not limited to the embodiment shown, but covers, on the contrary, all the variants which may be made thereto without departing either from its scope or its spirit.

What is claimed is:

1. In a filter constituted by:
   a filter body comprising a plurality of distinct chambers isolated from one another,
   a main stack of filtering elements contained in one of said chambers, called main chamber,
   a secondary stack of filtering elements contained in another of said chambers, called secondary chamber, each of the filtering elements of the main and secondary stacks having a recessed centre and a cylindrical side, comprising a plurality of sections isolated from one another and being provided on its outer and inner radial circumferences with orifices for communication of each of its sections with said circumferences,
   a shut-off distribution valve which is adjusted to said cylindrical side, which is mounted to rotate about the axis of the cylindrical side, and which comprises one main enclosure capable, in a first position of the distribution valve, of isolating a first section of any one filtering element of the main stack from the other sections of said filtering element and of communicating with said first section via the orifice for communication of said first section, and one secondary enclosure capable, in a second position of the distribution valve of isolating a first section of any one filtering element of the secondary stack from the other sections of said filtering element and of communicating with said first section via the orifice for the communication of said first section, and wherein
   a port, with which the distribution valve is provided, connects the main and secondary enclosures.

2. The filter of claim 1, further comprising: A second inside port contained within said distribution valve for communicating between said main and secondary enclosures; and
   connecting duct means, further including discharge orifice means, for connecting said secondary chamber directly to said second port when said valve is in said first position, said discharge orifice means being located such that said selector valve obstructs said discharge orifice means when said selector valve is in said second position, whereby communication between said main and secondary enclosures through said connecting duct means is blocked.

* * * * *